US010948596B2

(12) United States Patent
Wong

(10) Patent No.: US 10,948,596 B2
(45) Date of Patent: Mar. 16, 2021

(54) TIME-OF-FLIGHT IMAGE SENSOR WITH DISTANCE DETERMINATION

(71) Applicant: Sony Semiconductor Solutions Corporation, Kanagawa (JP)

(72) Inventor: Ping Wah Wong, Sunnyvale, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 408 days.

(21) Appl. No.: 15/878,936

(22) Filed: Jan. 24, 2018

(65) Prior Publication Data

US 2019/0227169 A1 Jul. 25, 2019

(51) Int. Cl.
| | | |
|---|---|---|
| *G01S 17/00* | (2020.01) | |
| *G01S 17/10* | (2020.01) | |
| *G01S 17/89* | (2020.01) | |
| *G01S 17/08* | (2006.01) | |
| *G01S 7/4865* | (2020.01) | |
| *G01S 7/4863* | (2020.01) | |
| *G01S 7/4915* | (2020.01) | |
| *H04N 5/347* | (2011.01) | |

(52) U.S. Cl.
CPC ............ *G01S 17/10* (2013.01); *G01S 7/4863* (2013.01); *G01S 7/4865* (2013.01); *G01S 7/4915* (2013.01); *G01S 17/08* (2013.01); *G01S 17/89* (2013.01); *H04N 5/347* (2013.01)

(58) Field of Classification Search
USPC .............................................. 356/4.01, 5.01
See application file for complete search history.

(56) References Cited

U.S. PATENT DOCUMENTS

| | | | | |
|---|---|---|---|---|
| 8,848,172 | B2* | 9/2014 | Eisele | G01S 7/4913 356/5.01 |
| 9,134,114 | B2* | 9/2015 | Metz | G01S 7/48 |
| 9,984,508 | B2* | 5/2018 | Mullins | G06T 19/20 |
| 10,101,452 | B2* | 10/2018 | Ikeno | G01S 17/89 |
| 10,229,502 | B2* | 3/2019 | Adam | G01S 17/894 |
| 10,324,171 | B2* | 6/2019 | Niclass | G01S 7/4863 |
| 10,620,300 | B2* | 4/2020 | Sharma | G01S 7/483 |
| 2011/0025827 | A1* | 2/2011 | Shpunt | H04N 13/271 348/47 |

(Continued)

FOREIGN PATENT DOCUMENTS

| | | | | |
|---|---|---|---|---|
| EP | 2966475 A1 * | 1/2016 | | G01S 17/36 |
| WO | WO-2019146457 A1 * | 8/2019 | | G01S 17/08 |

OTHER PUBLICATIONS

Written Opinion of the International Search Authority for PCT/JP2019/000987 (Year: 2019).*

*Primary Examiner* — James R Hulka
(74) *Attorney, Agent, or Firm* — Michael Best & Friedrich LLP

(57) ABSTRACT

A time-of-flight camera includes a light generator that generates an emitted light wave, a light sensor that receives a reflected light wave that corresponds to the emitted light wave reflected from an object, and distance determination circuitry. The distance determination circuitry determines response signals based on the reflected light wave, calculates signs corresponding to differences between pairs of the response signals, determines a phase region based on the signs, and determines a distance between the time-of-flight camera and the object based on a ratio of the differences.

20 Claims, 12 Drawing Sheets

(56) References Cited

U.S. PATENT DOCUMENTS

| | | | | |
|---|---|---|---|---|
| 2011/0267495 A1* | 11/2011 | Atkinson | ............... | H04N 5/378 |
| | | | | 348/229.1 |
| 2012/0056982 A1* | 3/2012 | Katz | ...................... | G06T 7/521 |
| | | | | 348/43 |
| 2012/0154542 A1* | 6/2012 | Katz | ...................... | G01S 17/87 |
| | | | | 348/47 |
| 2013/0208258 A1* | 8/2013 | Eisele | ................... | G01S 7/4913 |
| | | | | 356/5.01 |
| 2014/0253688 A1* | 9/2014 | Metz | ..................... | G01B 11/24 |
| | | | | 348/46 |
| 2016/0343169 A1* | 11/2016 | Mullins | ................ | G02B 27/017 |
| 2017/0276789 A1* | 9/2017 | Ikeno | ................... | G01S 17/894 |

* cited by examiner

TIME-OF-FLIGHT IMAGE SENSOR WITH DISTANCE DETERMINATION

BACKGROUND OF THE INVENTION

1. Field of the Invention

This application relates generally image sensors. More specifically, this application relates to a system and method for distance and depth determination in a time-of-flight image sensor.

2. Description of Related Art

Image sensing devices typically consist of an image sensor, generally implemented as an array of pixel circuits, as well as signal processing circuitry and any associated control or timing circuitry. Within the image sensor itself, charge is collected in a photoelectric conversion device of the pixel circuit as a result of the impingement of light. There are typically a very large number of individual photoelectric conversion devices (e.g. tens of millions), and many signal processing circuitry components working in parallel. Various components within the signal processing circuitry are shared by a large number of photoelectric conversion devices; for example, a column or multiple columns of photoelectric conversion devices may share a single analog-to-digital converter (ADC) or sample-and-hold (S/H) circuit.

In photography applications, the outputs of the pixel circuits are used to generate an image. In addition to photography, image sensors are used in a variety of applications which may utilize the collected charge for additional or alternative purposes. For example, in applications such as game machines, autonomous vehicles, telemetry systems, factory inspection, gesture controlled computer input devices, and the like, it may be desirable to detect the depth of various objects in a three-dimensional space.

Moreover, some image sensors support pixel binning operations. In binning, input pixel values from neighboring pixel circuits are averaged together with or without weights to produce an output pixel value. Binning results in a reduced resolution or pixel count in the output image, and may be utilized so as to permit the image sensor to operate effectively in low light conditions or with reduced power consumption One method for determining depths of points in a scene in an image sensor is time-of-flight (TOF) sensing. The TOF method utilizes an emitted light wave and a reflected light wave, and determines distance based on the relationship between these two light waves. However, TOF methods may suffer from various drawbacks such as a need for ambient light correction or decreased range. Furthermore, TOF methods may not be compatible with binning methods in image sensors.

Accordingly, there exists a need for a distance determination method in a TOF image sensor that does not require ambient correction, is compatible with methods such as pixel binning, and is capable of achieving the maximum theoretical range.

BRIEF SUMMARY OF THE INVENTION

Various aspects of the present disclosure relate to an image sensor and distance determination method therein.

In one aspect of the present disclosure, a time-of-flight camera is provided. The time-of-flight camera comprises a light generator configured to generate an emitted light wave; a light sensor configured to receive a reflected light wave, the reflected light wave corresponding to the emitted light wave reflected from an object; and distance determination circuitry configured to: determine a plurality of response signals based on the reflected light wave, calculate a first sign corresponding to a first difference between a first pair of the plurality of response signals and a second sign corresponding to a second difference between a second pair of the plurality of response signals, determine a phase region based on the first sign and the second sign, and determine a distance between the time-of-flight camera and the object based on a ratio including the first difference and the second difference.

In another aspect of the present disclosure, a distance determination method in a time-of-flight camera is provided. The distance determination method comprises generating an emitted light wave; receiving a reflected light wave, the reflected light wave corresponding to the emitted light wave reflected from an object; determining a plurality of response signals based on the reflected light wave; calculating a first sign corresponding to a first difference between a first pair of the plurality of response signals and a second sign corresponding to a second difference between a second pair of the plurality of response signals, determining a phase region based on the first sign and the second sign; and determining a distance between the time-of-flight camera and the object based on a ratio including the first difference and the second difference In this manner, the above aspects of the present disclosure provide for improvements in at least the technical field of depth sensing, as well as the related technical fields of imaging, image processing, and the like.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

Moreover, while the present disclosure focuses mainly on examples in which the processing circuits are used in image sensors, it will be understood that this is merely one example of an implementation. It will further be understood that the disclosed systems and methods can be used in any device in which there is a need to detect distance in a wave-based sensor; for example, an audio circuit, phononic sensor, a radar system, and the like.

[Image Sensor]

Figure 1:
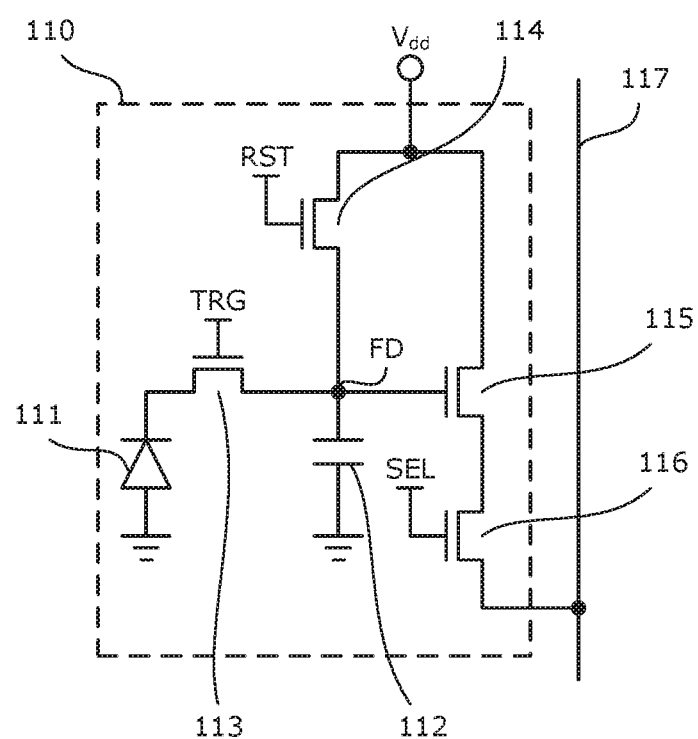
FIG. 1 illustrates an exemplary pixel circuit for use with various aspects of the present disclosure.
Figure 2:
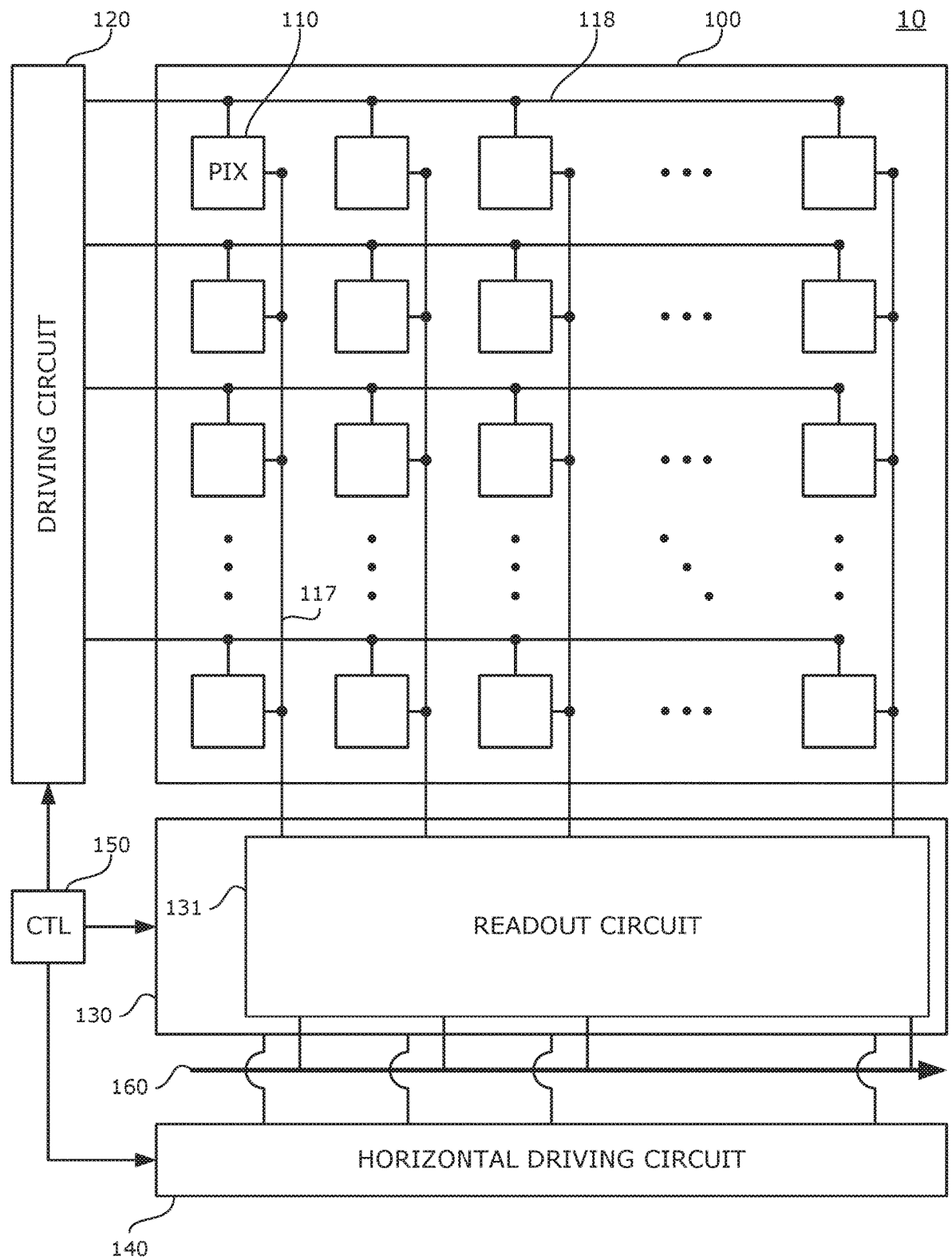
FIG. 2 illustrates an exemplary image sensor according to various aspects of the present disclosure.

FIGS. 1-2 illustrate a pixel circuit 110 and an image sensor 10 according to various aspects of the present disclosure. As shown in FIG. 1, a pixel circuit 110 includes a photoelectric conversion device 111 (e.g., a photodiode), a floating diffusion FD, a storage capacitor 112, a transfer transistor 113, a reset transistor 114, a source follower transistor 115, and a selection transistor 116, and a vertical signal line 117. As illustrated, the vertical signal line 117 is common to a plurality of pixel circuits within the same column. Alternatively, a particular vertical signal line may be shared among multiple columns. Gate electrodes of transfer transistor 113, reset transistor 114, and selection transistor 116 receive signals TRG, RST, and SEL, respectively. These signals may, for example, be provided by the control or timing circuitry. Light falling on photoelectric conversion device 111 is converted into an analog electrical signal.

While FIG. 1 illustrates a pixel circuit having four transistors in a particular configuration, the current disclosure is not so limited and may apply to a pixel circuit having fewer or more transistors as well as other elements, such as additional capacitors, resistors, and the like. Moreover, while FIG. 1 illustrates the source follower transistor 115 disposed between the selection transistor 116 and a power supply voltage $V_{dd}$, the selection transistor 116 may instead be disposed between the source follower transistor 116 and the power supply voltage $V_{dd}$. Additionally, the current disclosure may be extended to configurations where one or more transistors are shared among multiple photoelectric conversion devices.

The image sensor 10 includes an array 100 of the pixel circuits 110. The pixel circuits 110 are located at intersections where horizontal signal lines 118 and vertical signal lines 117 cross one another. The horizontal signal lines 118 are operatively connected to a vertical driving circuit 120, also known as a "row scanning circuit," at a point outside of the pixel array 100, and carry signals from the vertical driving circuit 120 to a particular row of the pixel circuits 110. Pixels in a particular column output an analog signal corresponding to an amount of incident light to the vertical signal line 117. For illustration purposes, only a subset of the pixel circuits 110 are actually shown in FIG. 2; however, in practice the image sensor 10 may have up to tens of millions of pixel circuits ("megapixels" or MP) or more.

The vertical signal line 117 conducts the analog signal for a particular column to a column circuit 130, also known as a "signal processing circuit." While FIG. 2 illustrates one vertical signal line 117 for each column in the pixel array 100, the present disclosure is not so limited. For example, more than one vertical signal line 117 may be provided for each column, or each vertical signal line 117 may correspond to more than one column. Moreover, while FIG. 2 illustrates a single readout circuit 131 for all columns, the image sensor 10 may utilize a plurality of readout circuits 131. The analog electrical signal generated in photoelectric conversion device 111 in the pixel circuit 110 is retrieved by the readout circuit 131 and is then converted to a digital value. Such a conversion typically requires several circuit components such as sample-and-hold (S/H) circuits, analog-to-digital converters (ADCs), and timing and control circuits, with each circuit component serving a purpose in the conversion. For example, the purpose of the S/H circuit may be to sample the analog signals from different time phases of the photodiode operation, after which the analog signals may be converted to digital form by the ADC.

Readout circuit 131 may be capable of performing the method of correlated double sampling (CDS). CDS is capable of overcoming some pixel noise related issues by sampling each pixel circuit 110 twice. First, the reset voltage $V_{reset}$ of a pixel circuit 110 is sampled. This may also be referred to as the P-phase value or cds value. Subsequently, the data voltage $V_{data}$ of the pixel circuit 110 (that is, the voltage after the pixel circuit 110 has been exposed to light) is sampled. This may also be referred to as the D-phase value or light-exposed value. The reset value $V_{reset}$ is then subtracted from the data value $V_{data}$ to provide a value which reflects the amount of light falling on the pixel circuit 110.

The column circuit 130 is controlled by a horizontal driving circuit 140, also known as a "column scanning circuit." Each of the vertical driving circuit 120, the column circuit 130, and the horizontal driving circuit 140 receive one or more clock signals from a controller 150. The controller 150 controls the timing and operation of various image sensor components such that analog signals from the pixel array 100, having been converted to digital signals in the column circuit 130, are output via an output circuit 160 for signal processing, storage, transmission, and the like.

[Distance Calculation—Pulsed and CW]

Figure 3:
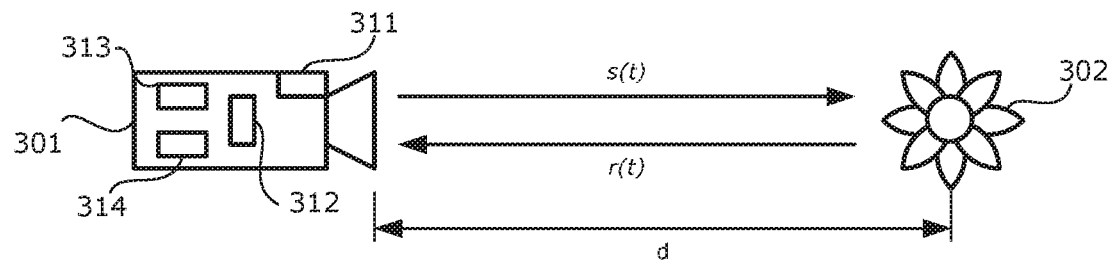
FIG. 3 illustrates an exemplary TOF imaging system according to various aspects of the present disclosure.

FIG. 3 illustrates a TOF imaging system 301 configured to image an object 302 located a distance d away. The TOF imaging system 301 includes a light generator 311 configured to generate an emitted light wave s(t) toward the object 302 and a light sensor 312 configured to receive a reflected light wave r(t) from the object 302. The light sensor 312 may be, for example, the image sensor 10 described above. The TOF imaging system 301 may further include distance determination circuitry such as a controller 313 (e.g., a CPU) and a memory 314. The light generator 311 may be, for example, a light emitting diode (LED), or a laser diode, or any other light generating device or combination of devices, and the light waveform may be controlled by the controller 313. The light generator may operate in the infrared range so as to reduce interference from the visible spectrum of light, although any wavelength range perceivable by the light sensor 312 may be utilized. The time τ required for the light wave to travel from the TOF imaging system 301 to the object 302 and back is related to the distance d via the following expression (1):

$$d = \frac{c\tau}{2} \quad (1)$$

Above, c represents the speed of light.

Figure 4:
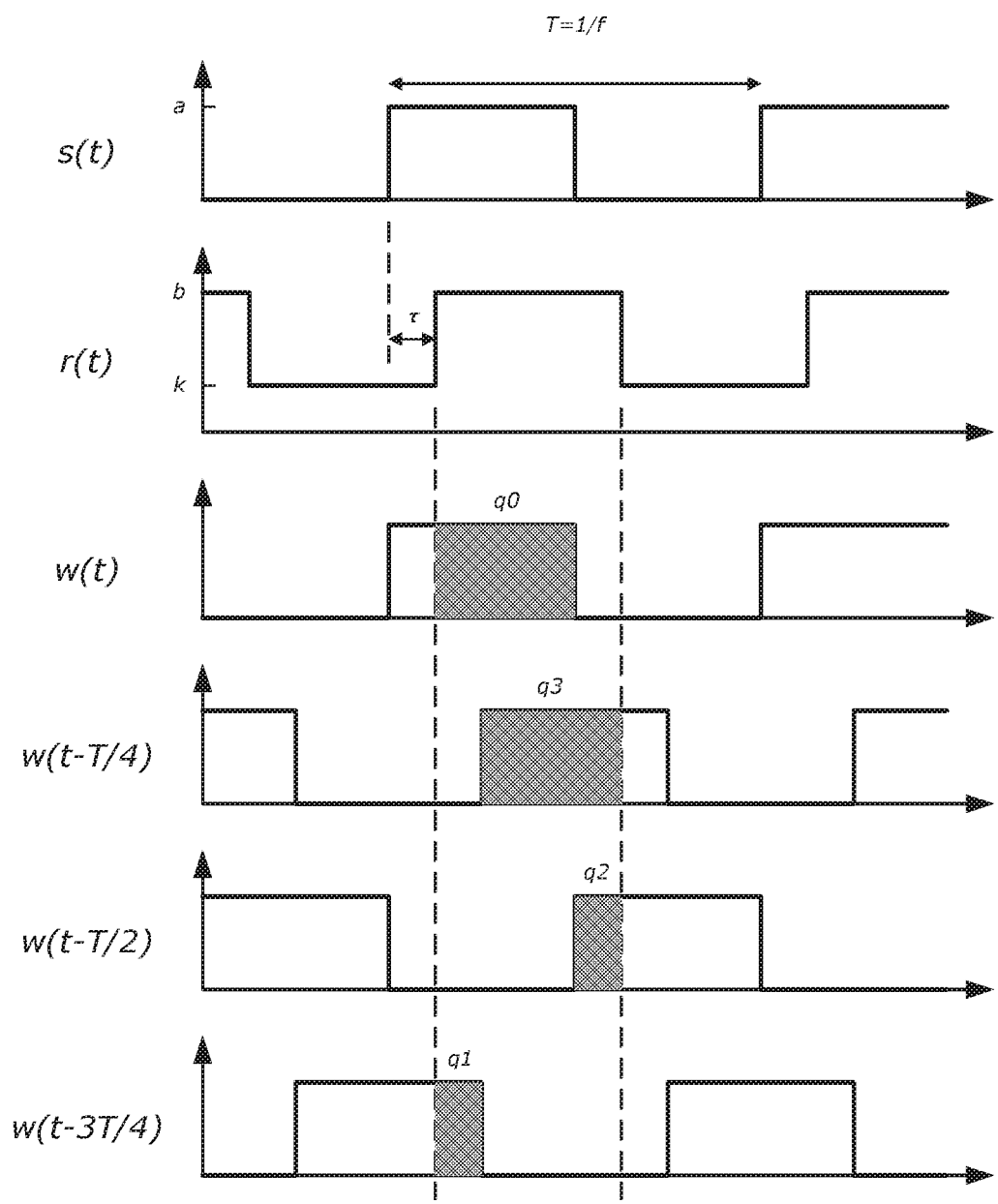
FIG. 4 illustrates exemplary timing waveforms for light signals in the exemplary imaging system of FIG. 3.

By performing a distance calculation independently for each pixel in a scene, it is possible to produce a depth map of the scene which gives the distance information on various portions of the object 302 and any other components of the scene. To perform this calculation, it is possible to use a pulsed method or a continuous wave (CW) method. FIG. 4 illustrates waveforms of exemplary signals used by the above methods. The emitted light wave s(t) is illustrated as a square wave having an amplitude a and a frequency f and period T. The emitted light wave s(t) does not need to be a square wave, but may instead have a sinusoidal, sawtooth, or any other repeating waveform. The reflected light wave r(t) at any particular pixel location is a delayed version of the emitted light wave s(t) subjected to system gain (e.g., gain applied by the TOF image sensor 301 and attenuation due to the transmission) plus an offset (e.g., caused by ambient light). Thus, the reflected light wave r(t) has an amplitude (b−k) and an offset k.

To measure the time delay, four timing windows w(t), w(t−T/4), w(t−T/2), and w(t−3T/4) are used in the TOF image sensor 301. Each timing window captures a response signal, labelled as q0, q3, q2, and q1, respectively. Conceptually, the distance may be estimated by the pulsed method as shown in the following expression (2):

$$d_{pulsed} = \frac{c}{4f}\left(\frac{q2'}{q0' + q2'}\right) \quad (2)$$

Above, the quantities q0' and q2' are calculated from the response signals q0 and q2, respectively, by subtracting the contributions due to ambient light. The ambient light correction, however, requires an estimate of the ambient light for each pixel, and thus may be scene dependent. Furthermore, this conceptual calculation results in a maximum range of distance detection of c/(4f) and may be utilized with a pixel binning operation as will be described in more detail below.

The distance may also be estimated by the pulsed method based on a ratio utilizing all four response signals according to the following modified expression (2'):

$$d_{pulsed} = \frac{c}{8f}\left(\frac{q3 - q1}{q3 - q1 + q0 - q2}\right) \quad (2')$$

This modified expression does not require ambient correction; however, the modified expression results in a more limited maximum range of distance detection as compared to expression (2). Specifically, the maximum range of distance detection in the modified case is c/(8f), which is half of the unmodified case.

Alternatively, the distance may be estimated by the CW method using all four response signals according to the following expression (3):

$$d_{CW} = \frac{c}{4\pi f}\tan^{-1}\left(\frac{q3 - q1}{q0 - q2}\right) \quad (3)$$

As the response signals are directly used, the CW method does not require ambient light correction and results in a maximum range of distance detection of c/(2f). However, the CW method does not work with the pixel binning operation.

Figure 5:
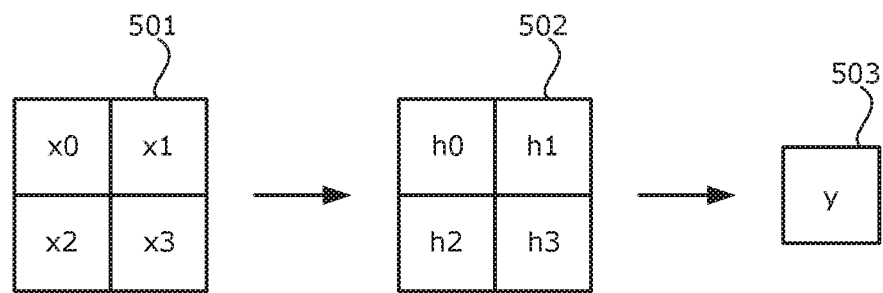
FIG. 5 illustrates an exemplary filtering interpretation according to various aspects of the present disclosure.
Figure 6:
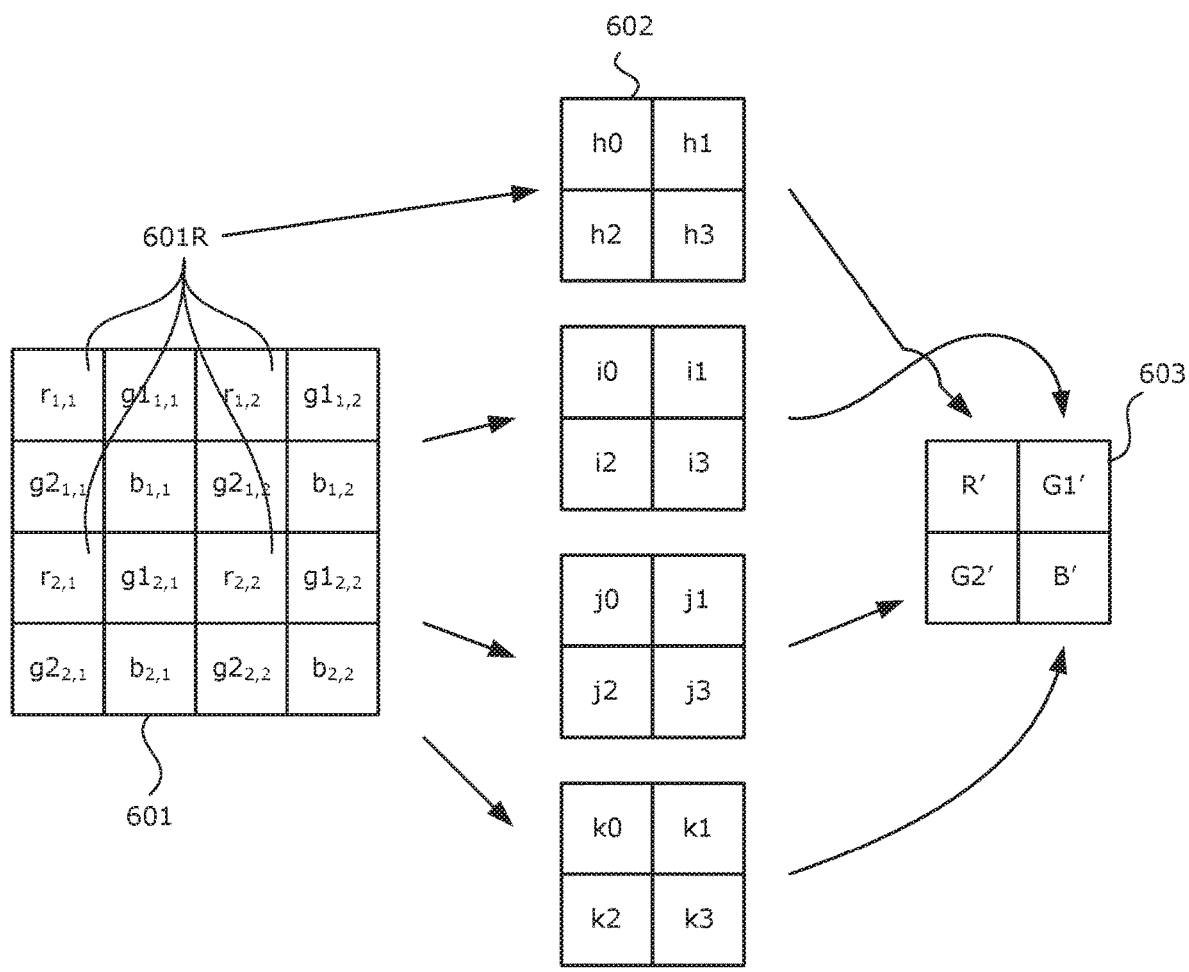
FIG. 6 illustrates another exemplary filtering interpretation according to various aspects of the present disclosure.

The pixel binning operation is illustrated in FIG. 5 for a monochrome image sensor and FIG. 6 for a color image sensor. In both illustrations, the scaling factor in both the vertical and horizontal directions is (½)X. In other words, the scaled image will be reduced by a factor of ½ in both directions, for an overall resolution reduction of ¼. In practice, the scaling factor may be generalized to (1/M)X in the horizontal direction and (1/N)X in the vertical direction, where M and N are any positive integers equal to or different from one another.

FIG. 5 illustrates a 2×2 block 501 of neighboring pixels labeled as x0, x1, x2, and x3. A weighted average is calculated using a weighting array 502 including weights h0, h1, h2, and h3. These weights may be interpreted as filter coefficients. A corresponding output pixel y is calculated according to the following expression (4):

$$y = \frac{h0x0 + h1x1 + h2x2 + h3x3}{h0 + h1 + h3 + h3} \quad (4)$$

The above calculation may be implemented as a digital filtering step and thus the binning operation may be implemented as a filtering procedure followed by down sampling. As illustrated in FIG. 6, the binning procedure for a color image sensor may be performed similarly. FIG. 6 corresponds to an image sensor having a Bayer color filter arrangement with red (R), green (G1/G2), and blue (B) pixels, although the binning procedure may be similarly applied to any other color filter arrangement such as one including emerald (E), white (W), cyan (C), magenta (M), or other colors in a RGBE, RGBW, CYM, or other arrangement.

FIG. 6 illustrates an 8×8 block 601 of neighboring pixels denoted by their color as noted above as well as the index (i,j) to denote their respective row and column ordering. First, each individual color is extracted. For example, a 2×2 block 601R of neighboring red pixels is extracted. Next, the extracted block 601R is weighted using a weighted array 602 including weights h0, h1, h2, and h3. Thus, an output pixel R' is calculated according to the following expression (5):

$$R' = \frac{h0 r_{1,1} + h1 r_{1,2} + h2 r_{2,1} + h3 r_{2,2}}{h0 + h1 + h3 + h3} \quad (5)$$

The above calculation is repeated for the G1, G2, and B pixels using the appropriate weights (i0, i1, i2, i3; j0, j1, j2, j3; or k0, k1, k2, k3) to produce output pixels G1', G2', and B'. Once these output pixels are calculated, they are reassembled in the same ordering as the input array so as to generate a 2×2 output block 603.

Depending on the real-world orientation of the scene, neighboring pixels can correspond to portions of the scene located at the same distance, and similar but different distances, or at very different distances. In the context of the depth calculation, it would be preferable if the estimated distance from the output pixel 503 or pixel block 603 were consistent with the distances estimated from the input pixel block 501 or pixel block 601. In other words, it would be preferable if the following expression (6) were true for any k and any set of $w_i$:

$$d\left(\frac{\sum_{i=0}^{k-1} w_i x_i}{\sum_{i=0}^{k-1} w_i}\right) = \frac{\sum_{i=0}^{k-1} w_i d(x_i)}{\sum_{i=0}^{k-1} w_i} \quad (6)$$

Above, $x_i$ represents input pixels that are binned together and $w_i$ represents the binning weights. The notation $d(\beta)$ represents the distance value calculated for the pixel or pixel group $\beta$. Expression (6) is true if the distance estimation operation and the binning operation are commutative. In other words, it is preferred that the distance estimated from the weighted average of captured pixel values be the same as the distance obtained by estimating the distance of each individual pixel and computing the weighted average of the individual estimates. However, expression (3) above is nonlinear and thus the CW method is not commutative with the binning operation without further modification.

Figure 7:
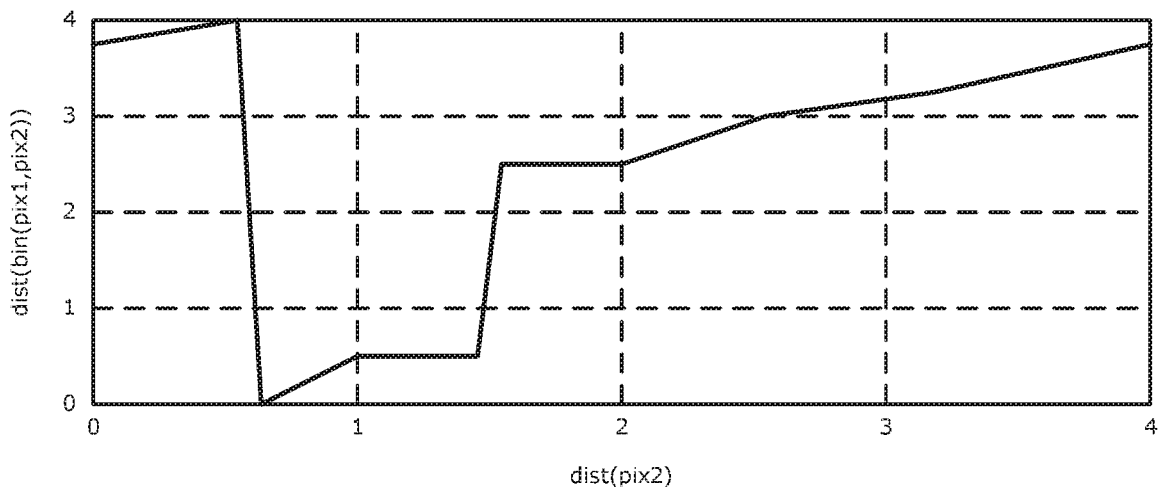
FIG. 7 illustrates a graph of an exemplary distance calculation according to various aspects of the present disclosure.

FIG. 7 illustrates the impact of the CW method and binning on one another given, for illustration purposes, an emitted light wave s(t) having a square waveform and a frequency f=3.713 MHz. In this situation, the maximum value for $d_{CW}$, and thus the maximum range of distance detection, is approximately 4 m. Furthermore, for illustration purposes, two adjacent pixels are binned with equal weights. In FIG. 7, a first pixel pix1 of the binned pair is kept at a fixed distance of 3.5 m and the second pixel pix2 of the binned pair is varied from 0 to 4 m. Thus, FIG. 7 shows the estimated distance of the binned pixel (y-axis) versus the actual distance of the second pixel pix2 (x-axis), where the estimated distance is calculated using CW method after binning. In this calculation, the response signals for pix1 are $q0_1$, $q1_1$, $q2_1$, and $q3_1$, and the response signals for pix2 are $q0_2$, $q1_2$, $q2_2$, and $q3_2$. Because the pixels are given equal weights, the binned response signals, calculated using a version of expression (4) for two inputs, become $q0_{bin}=(q0_1+q0_2)/2$, $q1_{bin}=(q1_1+q1_2)/2$, $q2_{bin}=(q2_1+q2_2)/2$, and $q3_{bin}=(q3_1+q3_2)/2$. After this binning operation, the distance $k_{CW}$ is calculated using expression (3). In this case, expression (6) is not true and thus it can be seen that the CW method and binning are not commutative. For example, with pix1 at 3.5 m and pix2 at 1 m, the estimated distance if binning is performed first is 0.5 m but the estimated distance if binning is performed second is 2.25 m.

Figure 8:
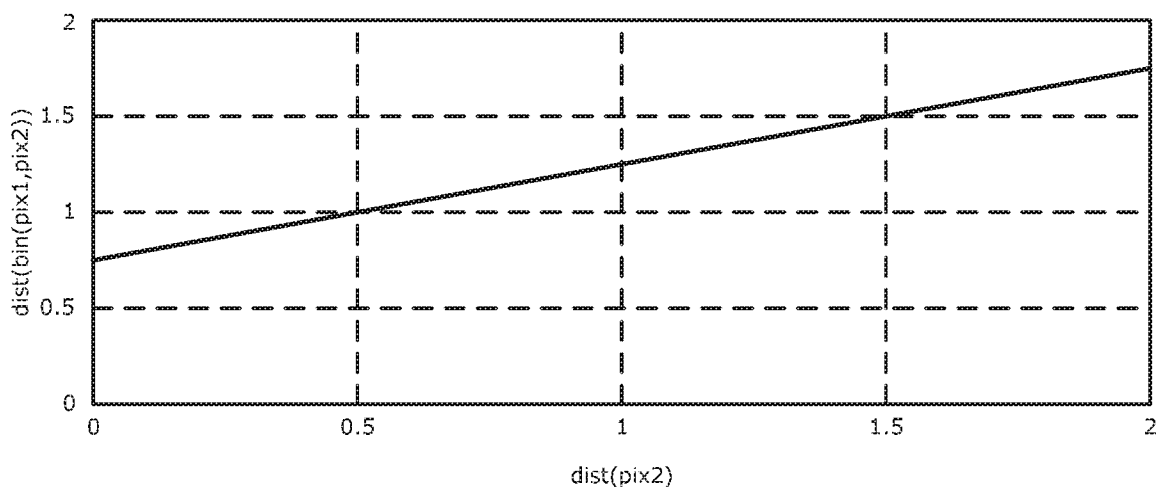
FIG. 8 illustrates a graph of another exemplary distance calculation according to various aspects of the present disclosure.

In contrast, FIG. 8 illustrates the impact of the pulsed method and binning on one another given, for illustration purposes, the same emitted light wave s(t) as used with reference to FIG. 7 above. In this situation, the maximum value for $d_{pulsed}$, and thus the maximum range of distance detection, is approximation 2 m. As in FIG. 7, for illustration purposes, two adjacent pixels are binned with equal weights. In FIG. 8, the first pixel pix1 is kept at a fixed distance of 1.5 m and the second pixel pix2 is varied from 0 to 2 m. As can be seen by the linear nature of FIG. 8, expression (6) is true for the pulsed method and thus the pulsed method and binning are commutative. This relationship holds true for the binning of any number of pixels with any set of weighting coefficients. However, as noted above, the pulsed method has a reduced maximum range of distance detection and requires ambient light correction to be performed prior to calculation.

[Distance Calculation—Two-Four Pulse Ratio]

Preferably, a distance calculation method that is compatible with binning and does not require ambient light correction is used. This method is referred to as a "two-four pulse ratio" (TFPR) method. Referring again to FIG. 4, it can be seen that q0 describes the correlation between the emitted light wave s(t) and the reflected light wave r(t) and thus the correlation between the emitted light wave s(t) and a delayed signal s(t−τ) after subjected to a system gain G and offset D, q1 describes the correlation between s(t−3T/4) and s(t−τ) after subjected to a system gain G and offset D, q2 describes the correlation between s(t−T/2) and s(t−τ) after subjected to a system gain G and offset D, and q3 describes the correlation between s(t−T/4) and s(t−τ) after subjected to a system gain G and offset D. This is true because the reflected light wave r(t) corresponds to the emitted light wave s(t) subjected to the system gain G and offset D in each case. Thus, the various response signals may be written as shown in the following expressions (7a)-(7d):

$$q0(\tau) = \int_0^T s(t) r(t) dt = \int_0^T s(t)[Gs(t-\tau)+D]dt = Gc(\tau) + \frac{aDT}{2} \quad (7a)$$

$$q1(\tau) = \int_0^T s\left(t - \frac{3T}{4}\right) r(t) dt = Gc\left(\tau + \frac{T}{4}\right) + \frac{aDT}{2} \quad (7b)$$

$$q2(\tau) = \int_0^T s\left(t - \frac{T}{2}\right) r(t) dt = Gc\left(\tau + \frac{T}{2}\right) + \frac{aDT}{2} \quad (7c)$$

$$q3(\tau) = \int_0^T s\left(t - \frac{T}{4}\right) r(t) dt = Gc\left(\tau + \frac{3T}{4}\right) + \frac{aDT}{2} \quad (7d)$$

Above, c(τ) is the autocorrelation function of s(t) at time delay τ. For the square wave signal illustrated in FIG. 4, the autocorrelation function c(τ) is calculated according to the following expression (8):

$$c(\tau) = \int_0^T s(t)s(t-\tau)dt$$

$$= \begin{cases} -a(b-k)(\tau - nT) + \frac{abT}{2}, & nT \le \tau < nT + \frac{T}{2} \\ a(b-k)(\tau - nT) + \frac{a(2k-b)T}{2}, & nT + \frac{T}{2} \le \tau < nT + T \end{cases} \quad (8)$$

Above, n is any integer. The response signals may be rewritten in a simplified form if the following definition (9) is used:

$$g(\tau) = Gc(\tau) + \frac{aDT}{2} \quad (9)$$

Thus, the response signals are rewritten as shown in the following expressions (10a)-(10d):

$$q0(\tau) = g(\tau) \quad (10a)$$

$$q1(\tau) = g\left(\tau + \frac{T}{4}\right) \quad (10b)$$

$$q2(\tau) = g\left(\tau + \frac{T}{2}\right) \quad (10c)$$

$$q3(\tau) = g\left(\tau + \frac{3T}{4}\right) \quad (10d)$$

Figure 9:
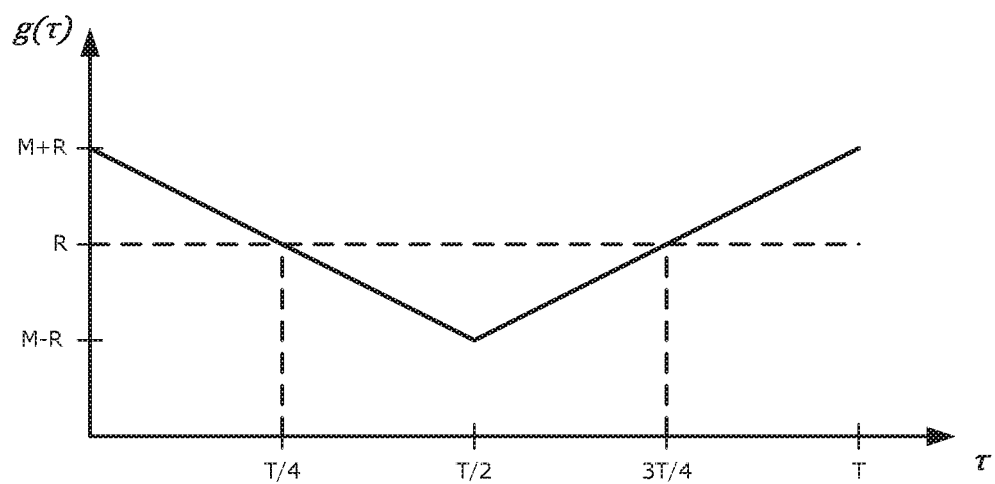
FIG. 9 illustrates an exemplary correlation function according to various aspects of the present disclosure.
Figure 10A:
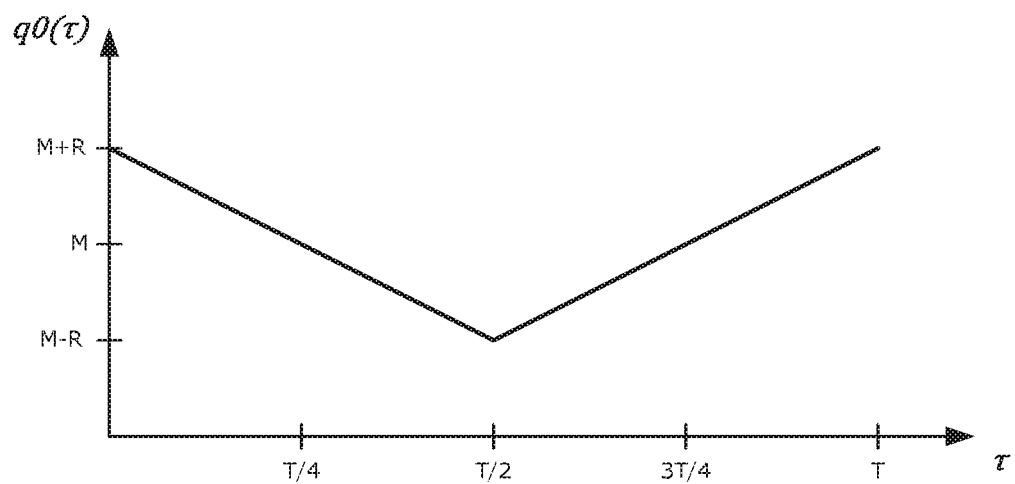
FIG. 10A illustrates a plot of an exemplary response signal according to various aspects of the present disclosure.
Figure 10B:
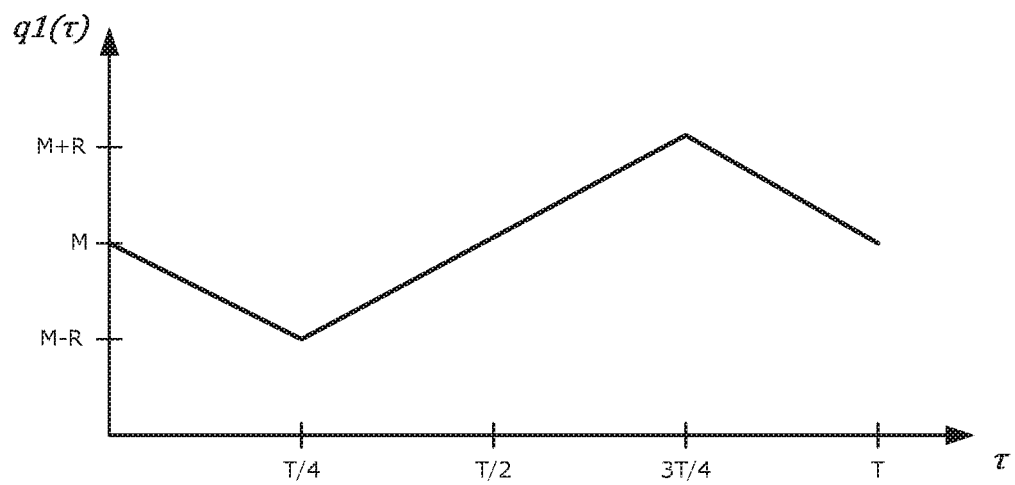
FIG. 10B illustrates another plot of an exemplary response signal according to various aspects of the present disclosure.
Figure 10C:
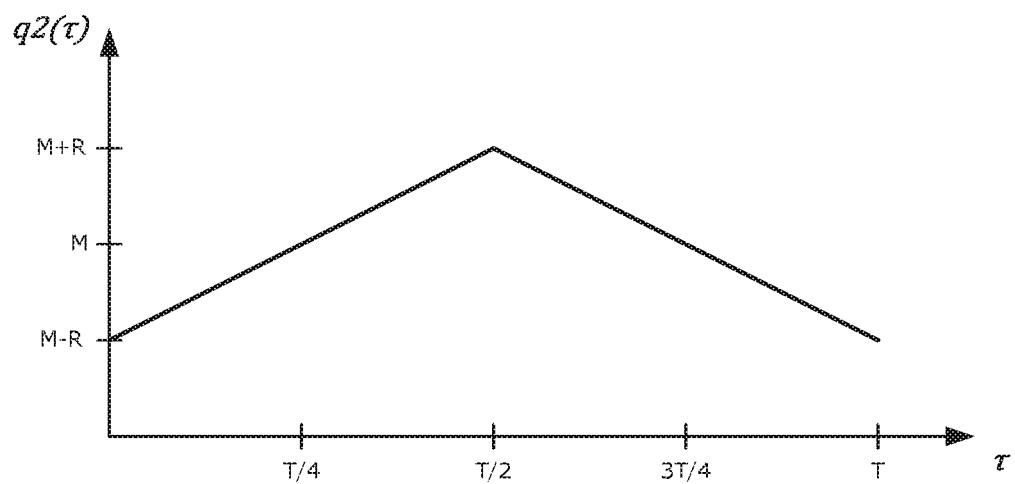
FIG. 10C illustrates another plot of an exemplary response signal according to various aspects of the present disclosure.
Figure 10D:
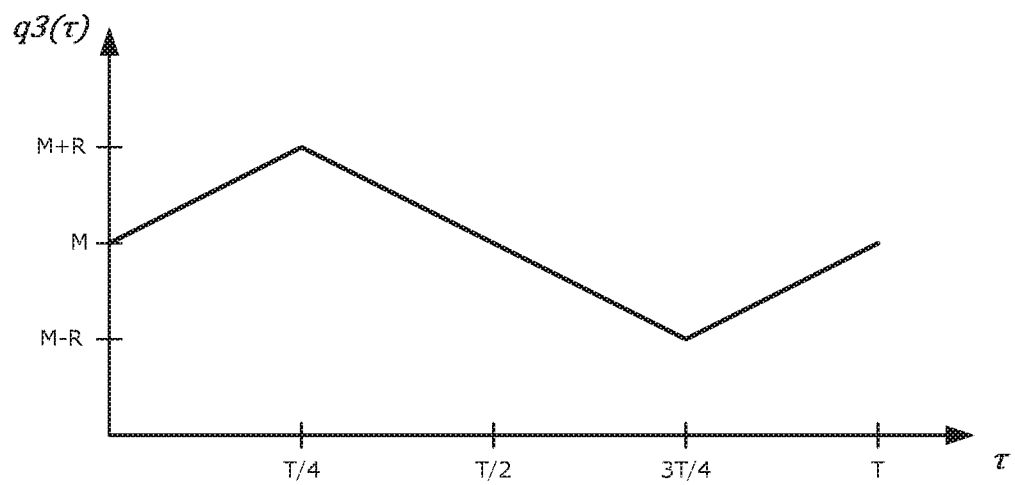
FIG. 10D illustrates another plot of an exemplary response signal according to various aspects of the present disclosure.

FIG. 9 illustrates one cycle of the periodic function $g(\tau)$ from 0 to T, where quantities M and R are defined according to the following expressions (11) and (12), respectively:

$$M = \frac{1}{2}\left[a(Gb+D)\frac{T}{2} + a(Gk+D)\frac{T}{2}\right] = \frac{aT}{4}[G(b+k)+2D] \quad (11)$$

$$R = \frac{1}{2}\left[a(Gb+D)\frac{T}{2} - a(Gk+D)\frac{T}{2}\right] = \frac{aT}{4}G(b-k) \quad (12)$$

Because $g(\tau)$ is periodic with periodicity T, the value of the function can be uniquely determined from FIG. 9 for any $\tau$. As shown in FIG. 9, $g(\tau)$ decreases linearly from its maximum value M+R at $\tau=0$ to its minimum value M−R at $\tau=T/2$, and increases linearly from the minimum value to its maximum value M+R at $\tau=T$. Thus, $g(\tau)+g(\tau+T/2)=2M$ for all $\tau$. FIGS. 10A-D illustrate the response signals as shown in the above expressions (10a)-(10d) for a cycle from 0 to T, and thus illustrate the phase shifted relationship among the signal curves. For an object at any distance within the maximum range of (c/2f) having a delay value $\tau$, the response signal values captures by the TOF image sensor 301 are equal to those illustrated in FIGS. 10A-D at the given $\tau$.

Comparing the signal curves in FIGS. 10A-D to one another, the cycle can be partitioned into four phase regions [0,T/4]; [T/4,T/2]; [T/2,3T/4]; and [3T/4, T) based on the slopes of the individual signal curves. Thus, using the same set of parameters q0, q1, q2, and q3, the distance may be calculated according to the following expression (13):

$$d_{TFPR} = \begin{cases} \frac{c}{8f}\left(\frac{q3-q1}{q3-q1+q0-q2}\right), & 0 \leq \tau < \frac{T}{4} \\ \frac{c}{8f}\left(\frac{q2-q0}{q2-q0+q3-q1}+1\right), & \frac{T}{4} \leq \tau < \frac{T}{2} \\ \frac{c}{8f}\left(\frac{q3-q1}{q3-q1+q0-q2}+2\right), & \frac{T}{2} \leq \tau < \frac{3T}{4} \\ \frac{c}{8f}\left(\frac{q2-q0}{q2-q0+q3-q1}+3\right), & \frac{3T}{4} \leq \tau < T \end{cases} \quad (13)$$

Thus, in order to determine which part of expression (13) will return the correct distance, it is necessary to know the range of $\tau$ corresponding to the object. Because the actual distance of the object is not known prior to the calculation, the actual distance cannot be used to infer the range of T. In order to infer the range of $\tau$, expressions (8), (9), and (10a)-(10d) are used to define difference values $\Delta 0$ and $\Delta 1$ which are calculated according to the following expressions (14) and (15):

$$\Delta 0 = q3(\tau) - q1(\tau) = \begin{cases} \frac{8R\tau}{T}, & 0 \leq \tau < \frac{T}{4} \\ 2R - \frac{8R\left(\tau - \frac{T}{4}\right)}{T}, & \frac{T}{4} \leq \tau < \frac{T}{2} \\ -\frac{8R\left(\tau - \frac{T}{2}\right)}{T}, & \frac{T}{2} \leq \tau < \frac{3T}{4} \\ -2R + \frac{8R\left(\tau - \frac{3T}{4}\right)}{T}, & \frac{3T}{4} \leq \tau < T \end{cases} \quad (14)$$

$$\Delta 1 = q2(\tau) - q0(\tau) = \begin{cases} -2R + \frac{8R\tau}{T}, & 0 \leq \tau < \frac{T}{4} \\ \frac{8R\left(\tau - \frac{T}{4}\right)}{T}, & \frac{T}{4} \leq \tau < \frac{T}{2} \\ 2R - \frac{8R\left(\tau - \frac{T}{2}\right)}{T}, & \frac{T}{2} \leq \tau < \frac{3T}{4} \\ -\frac{8R\left(\tau - \frac{3T}{4}\right)}{T}, & \frac{3T}{4} \leq \tau < T \end{cases} \quad (15)$$

Figure 11A:
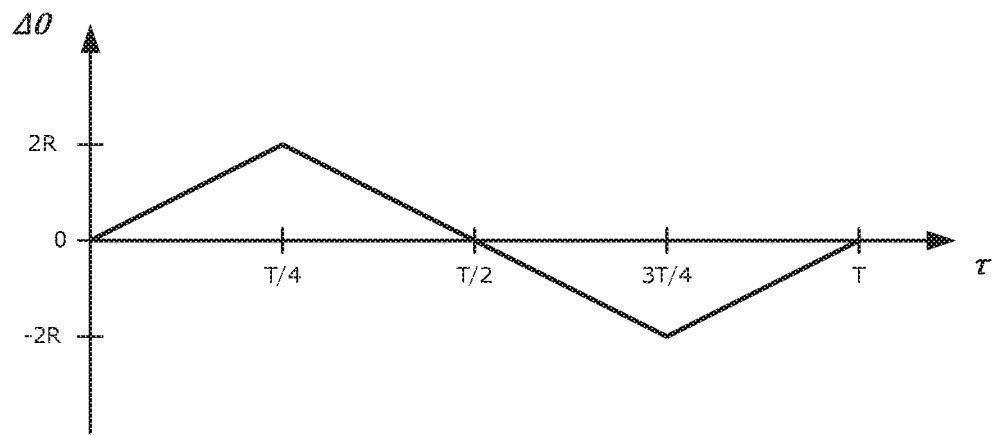
FIG. 11A illustrates a plot of an exemplary calculation signal according to various aspects of the present disclosure.
Figure 11B:
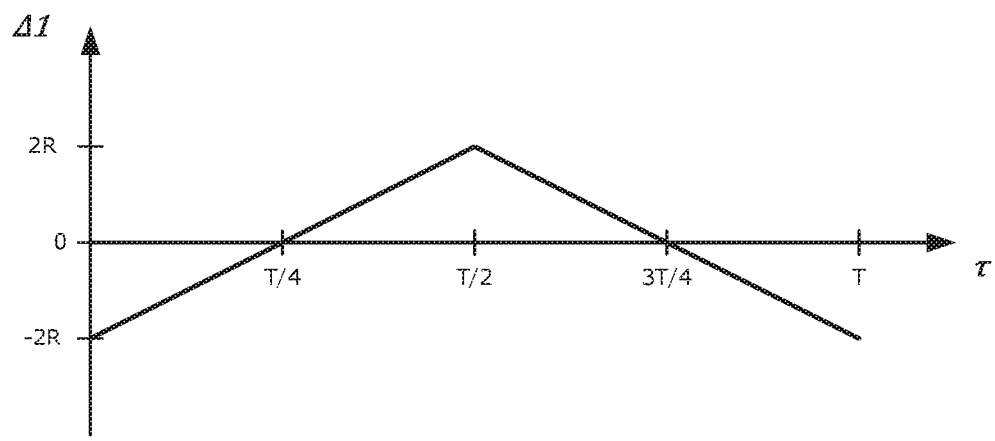
FIG. 11B illustrates another plot of an exemplary calculation signal according to various aspects of the present disclosure.

FIGS. 11A-B illustrate the quantities $\Delta 0$ and $\Delta 1$ as functions of the time delay $\tau$. It is clear from the plots that the combination of signs (±) of $\Delta 0$ and $\Delta 1$ is unique within each phase region as defined above. That is, in region [0,T/4] $\Delta 0$ is positive and $\Delta 1$ is negative; in region [T/4,T/2) both $\Delta 0$ and $\Delta 1$ are positive; in region [T/2,3T/4) $\Delta 0$ is negative and $\Delta 1$ is positive; and in region [3T/4, T) both $\Delta 0$ and $\Delta 1$ are negative. Thus, it is possible to infer the range of $\tau$ from the signs of $\Delta 0$ and $\Delta 1$, and calculate a distance value as illustrated in FIG. 12.

Figure 12:
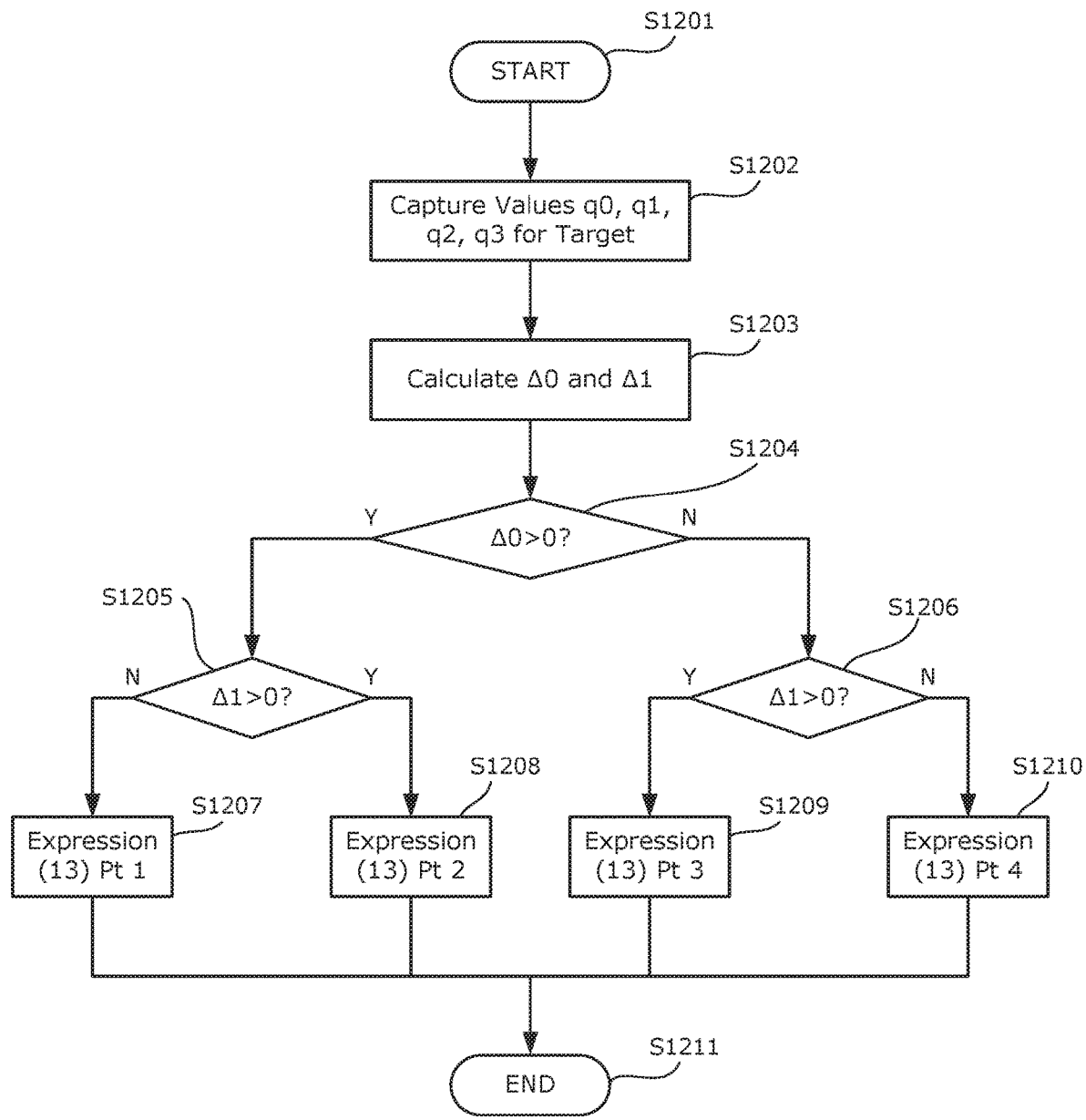
FIG. 12 illustrates a flowchart for an exemplary distance calculation method according to various aspects of the present disclosure.

Specifically, FIG. 12 illustrates an exemplary process flow for the TFPR distance calculation method. The TFPR distance calculation method begins at step S1201. First, in step S1202, the values q0, q1, q2, and q3 for a pixel location where an object distance is to be calculated are captured using a TOF image sensor, such as the TOF image sensor 301 described above. In step S1203, the difference values $\Delta 0$ and $\Delta 1$ are calculated according to expressions (14) and (15). At step S1204, it is determined whether $\Delta 0$ is positive or negative. If $\Delta 0$ is positive, the TFPR distance calculation method proceeds to step S1205 and it is determined whether $\Delta 1$ is positive or negative. If $\Delta 1$ is negative, the TFPR distance calculation method proceeds to step S1207 and uses part 1 of expression (13) which corresponds to the region [0,T/4). If $\Delta 1$ is positive, the TFPR distance calculation method proceeds to step S1208 and uses part 2 of expression (13) which corresponds to the region [T/4,T/2). If, however, it was determined at step S1204 that $\Delta 0$ is negative, the TFPR distance calculation method proceeds to step S1206 and it is determined whether $\Delta 1$ is positive or negative. If $\Delta 1$ is positive, the TFPR distance calculation method proceeds to step S1209 and uses part 3 of expression (13) which corresponds to the region [T/2,3T/4). If $\Delta 1$ is negative, the TFPR distance calculation method proceeds to step S1210 and uses part 4 of expression (13) which corresponds to the region [3T/4, T). After the appropriate part of expression (13) is used, the TFPR distance calculation method ends at step S1211.

While the values q0, q1, q2, and q3 are captures by the TOF image sensor, the distance calculations (e.g., steps S1202 through S1211) can be performed either within an image processing circuit internal or external to the image sensor, by hardware modules built into the image sensor or on a separate semiconductor chip, or by software modules running within the image sensor or in an external computing device. Examples of hardware modules include image processing circuitry, an application specific integrated circuit (ASIC), field programmable gate arrays (FPGA), a dedicated small logic module, and the like. Examples of software modules include software running on a computer, a digital signal processor, mathematical processors, and the like. In one example, the calculations are performed in readout circuit 131 described above.

The TFPR distance calculation method utilizes the same parameters q0, q1, q2, and q3, and thus does not require any redesign in the pixel circuit, analog readout circuit, S/H circuit, ADC, digital data control circuits, and the like as compared with the pulsed method and the CW method. Moreover, as can be seen by comparing expression (3) with expression (13), the TFPR distance calculation method requires only simple add, subtract, multiply, and divide operations and no complex trigonometric functions. Taking the corresponding parts of expressions (13)-(15) together, it can be seen that within each τ range, the distance calculated corresponds to (cτ/2), which is the correct object distance set forth in expression (1) above.

Moreover, the maximum working range of the delay value τ is T, and thus the maximum distance range for the TFPR distance calculation method is (cT/2) or c/(2f). This corresponds to the full range available in the CW method, and is double the range available in the pulsed method. Additionally, while expressions (7a)-(7d) include the quantity D and thus are affected by ambient light, this offset is canceled out due to the difference calculations included in expressions (13)-(15) and thus the TFPR distance calculation method does not require any ambient light correction. Furthermore, the TFPR distance calculation method is free from any interference caused by system gain G because this parameter is canceled out in the calculation of the ratios in expression (13). The TFPR distance calculation method has the additional benefit in that it is compatible with binning.

Specifically, the TFPR distance calculation method described above is commutative with the binning operation when the pixels to be binned are within the same phase range of [0,T/4); [T/4,T/2); [T/2,3T/4); or [3T/4, T). As noted above, the binned response signals may be calculated using a modified version of expression (4), which can be generalized for the binning of k pixels with arbitrary weights $w_i$ as the following expressions (16a)-(16d):

$$q0_{bin} = \frac{\sum_{i=0}^{k-1} w_i q0_i}{\sum_{i=0}^{k-1} w_i} \tag{16a}$$

$$q1_{bin} = \frac{\sum_{i=0}^{k-1} w_i q1_i}{\sum_{i=0}^{k-1} w_i} \tag{16b}$$

$$q2_{bin} = \frac{\sum_{i=0}^{k-1} w_i q2_i}{\sum_{i=0}^{k-1} w_i} \tag{16c}$$

$$q3_{bin} = \frac{\sum_{i=0}^{k-1} w_i q3}{\sum_{i=0}^{k-1} w_i} \tag{16d}$$

For ease of presentation, let $\Sigma_i w_i = W$. Over the phase range [0,T/4), the expressions (13) and (16a)-(16d) become the following expression (17):

$$\begin{aligned} d_{TFPR,bin} &= \frac{c}{8f}\left(\frac{q3_{bin} - q1_{bin}}{q3_{bin} - q1_{bin} + q0_{bin} - q2_{bin}}\right) \\ &= \frac{cT}{8}\left(\frac{\left[\sum_{i=0}^{k-1} w_i q3_i - \sum_{i=0}^{k-1} w_i q1_i\right]/W}{\left[\sum_{i=0}^{k-1} w_i q3_i - \sum_{i=0}^{k-1} w_i q1_i + \sum_{i=0}^{k-1} w_i q0_i - \sum_{i=0}^{k-1} w_i q2_i\right]/W}\right) \\ &= \frac{cT}{8}\left(\frac{\sum_{i=0}^{k-1} w_i(q3_i - q1_i)}{\sum_{i=0}^{k-1} w_i(q3_i - q1_i + q0_i - q2_i)}\right) \end{aligned} \tag{17}$$

Using expressions (14) and (15), the distance when all the binned pixels are within the phase range [0,T/4) becomes the following expression (18):

$$d_{TFPR,bin} = \frac{cT}{8}\left(\frac{\frac{8R}{T}\sum_{i=0}^{k-1} w_i \tau_i}{2R\sum_{i=0}^{k-1} w_i}\right) = \sum_{i=0}^{k-1} \frac{w_i c\tau_i}{2W} \tag{18}$$

Above, R is the quantity defined in expression (12). Performing the operations in the reverse order and using expression (1) above leads to the following expression (19):

$$d_{bin,TFPR} = \frac{\sum_{i=0}^{k-1} w_i d_i}{\sum_{i=0}^{k-1} w_i} = \sum_{i=0}^{k-1} \frac{w_i c\tau_i}{2W} \tag{19}$$

Expressions (18) and (19) are equal to one another, and thus the binning operation and the TFPR distance calculation method are commutative with one another when all the pixels in the binning calculation are within the range [0,T/4). It can readily be shown that the TFPR distance calculation method and the binning operation are commutative when all the pixels in the binning calculation are within any one of the phase ranges [T/4,T/2), [T/2,3T/4), and [3T/4,T) using the appropriate part of expression (13) in the above proof, though these calculations are not reproduced here. This holds for any filter coefficient (i.e., set of weights) and any scaling factor (i.e., number of pixels binned).

Figure 13:
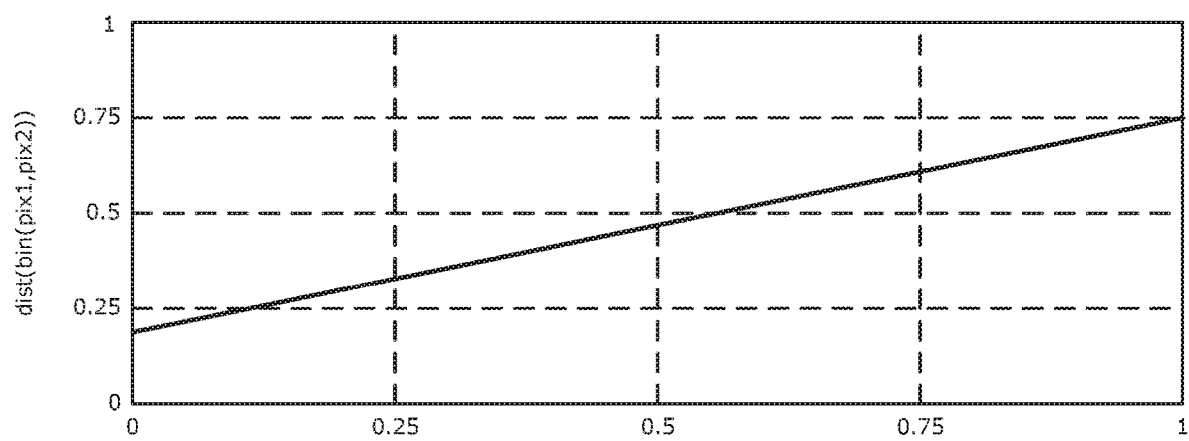
FIG. 13 illustrates a graph of another exemplary distance calculation according to various aspects of the present disclosure.

FIG. 13 illustrates the impact of the TFPR distance calculation method and binning on one another given, for illustration purposes, an emitted light wave s(t) having a square waveform and a frequency f=3.713 MHz and the phase range [0,T/4). For illustration purposes, two adjacent pixels are binned with equal weights. In FIG. 13, a first pixel pix1 of the binned pair is kept at a fixed distance of 0.375 m and a second pixel pix2 of the binned pair is varied from 0 to 1 m. As can be seen from FIG. 13, expression (6) above is true.

Because the TFPR distance calculation method is commutative with the binning operation within a single phase range, the TOF image sensor may be configured to operate only within the phase region [0,T/4] in a case where binning is desired. In this case, the maximum range of distance estimation is (cT/8) or c/(8f). The modulation frequency f may be chosen accordingly to satisfy the required distance range in this case.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A time-of-flight camera, comprising:
    a light generator configured to generate an emitted light wave;
    a light sensor configured to receive a reflected light wave, the reflected light wave corresponding to the emitted light wave reflected from an object; and
    distance determination circuitry configured to:
        determine a plurality of response signals based on the reflected light wave, respective ones of the plurality of response signals corresponding to a different timing window of a period of the reflected light wave,
        calculate a first sign corresponding to a first difference between a first pair of the plurality of response signals and a second sign corresponding to a second difference between a second pair of the plurality of response signals, the first sign indicating whether the first difference is positive or negative and the second sign indicating whether the second difference is positive or negative,
        determine a phase region based on the first sign and the second sign, and
        determine a distance between the time-of-flight camera and the object based on a distance formula corresponding to the determined phase region, wherein the distance formula includes a ratio including the first difference and the second difference.

2. The time-of-flight camera according to claim 1, wherein the plurality of response signals includes four response signals.

3. The time-of-flight camera according to claim 1, wherein a numerator of the ratio includes the first difference, and a denominator of the ratio includes the first difference and the second difference.

4. The time-of-flight camera according to claim 1, wherein the emitted light wave is a periodic wave having a predetermined frequency.

5. The time-of-flight camera according to claim 4, wherein a range of the distance determination is c/(2f), where c is the speed of light and f is the predetermined frequency.

6. The time-of-flight camera according to claim 4, wherein the emitted light wave is a square wave.

7. The time-of-flight camera according to claim 1, wherein the emitted light wave is in an infrared wavelength range.

8. The time-of-flight camera according to claim 1, wherein the light sensor includes a plurality of pixels arranged in an array.

9. The time-of-flight camera according to claim 8, wherein the distance determination circuitry is configured to perform a binning operation wherein outputs from a block of the plurality of pixels are linearly combined.

10. The time-of-flight camera according to claim 9, wherein the distance determination circuitry is configured to provide a same result in a first case in which the binning operation is performed before determining the distance and in a second case in which the binning operation is performed after determining the distance.

11. A distance determination method in a time-of-flight camera, comprising:
    generating an emitted light wave;
    receiving a reflected light wave, the reflected light wave corresponding to the emitted light wave reflected from an object;

determining a plurality of response signals based on the reflected light wave, respective ones of the plurality of response signals corresponding to a different timing window of a period of the reflected light wave;

calculating a first sign corresponding to a first difference between a first pair of the plurality of response signals and a second sign corresponding to a second difference between a second pair of the plurality of response signals, the first sign indicating whether the first difference is positive or negative and the second sign indicating whether the second difference is positive or negative, determining a phase region based on the first sign and the second sign; and determining a distance between the time-of-flight camera and the object based on a distance formula corresponding to the determined phase region, wherein the distance formula includes a ratio including the first difference and the second difference.

12. The distance determination method according to claim 11, wherein the plurality of response signals includes four response signals.

13. The distance determination method according to claim 11, wherein a numerator of the ratio includes the first difference, and a denominator of the ratio includes the first difference and the second difference.

14. The distance determination method according to claim 11, wherein the emitted light wave is a periodic wave having a predetermined frequency.

15. The distance determination method according to claim 14, wherein a range of the distance determination is $c/(2f)$, where c is the speed of light and f is the predetermined frequency.

16. The distance determination method according to claim 14, wherein the emitted light wave is a square wave.

17. The distance determination method according to claim 11, wherein the emitted light wave is in an infrared wavelength range.

18. The distance determination method according to claim 17, wherein the distance is determined to be the same in a first case in which the binning operation is performed before determining the distance and in a second case in which the binning operation is performed after determining the distance.

19. The distance determination method according to claim 11, wherein the reflected light wave is received by light sensor that includes a plurality of pixels arranged in an array.

20. The distance determination method according to claim 19, further comprising performing a binning operation wherein outputs from a block of the plurality of pixels are linearly combined.

* * * * *